(12) United States Patent
Arnault et al.

(10) Patent No.: US 7,320,337 B2
(45) Date of Patent: Jan. 22, 2008

(54) FLUID DISTRIBUTION AND CONTROL VALVE AND USE THEREOF TO SUPPLY ENRICHED AIR TO THE OCCUPANTS OF AN AIRCRAFT

(75) Inventors: Jean Arnault, Saint Nazaire les Eymes (FR); Stéphane Lessi, Grenoble (FR)

(73) Assignee: L'Air Liquide, Societe Anonyme a Directoire et Conseil de Surveillance pour l'Etude et l'Exploitation des Procedes Georges Claude, Paris (FR)

( * ) Notice: Subject to any disclaimer, the term of this patent is extended or adjusted under 35 U.S.C. 154(b) by 167 days.

(21) Appl. No.: 11/090,108

(22) Filed: Mar. 25, 2005

(65) Prior Publication Data

US 2005/0211318 A1 Sep. 29, 2005

(30) Foreign Application Priority Data

Mar. 26, 2004 (FR) .................................. 04 50605

(51) Int. Cl.
*F16K 11/07* (2006.01)
(52) U.S. Cl. .............................. 137/625.69; 137/625.68
(58) Field of Classification Search ........... 137/625.67, 137/625.48, 625.68, 625.69
See application file for complete search history.

(56) References Cited

U.S. PATENT DOCUMENTS

| 750,331 | A | * | 1/1904 | Ackley .................. 137/625.66 |
| 3,411,538 | A | | 11/1968 | Gruner et al. |
| 4,267,862 | A | | 5/1981 | Bowman et al. |
| 4,646,785 | A | * | 3/1987 | Ruedle et al. .......... 137/625.64 |
| 5,167,254 | A | * | 12/1992 | Walter et al. ................ 137/595 |
| 5,327,800 | A | * | 7/1994 | Van Selous .................. 475/131 |
| 5,505,765 | A | * | 4/1996 | Kaji et al. ...................... 95/100 |
| 6,364,280 | B1 | * | 4/2002 | Stach ..................... 137/625.69 |
| 2003/0118186 | A1 | * | 6/2003 | Gilley ......................... 380/268 |

FOREIGN PATENT DOCUMENTS

| FR | 1 332 592 | 7/1963 |
| GB | 1 589 042 | 5/1981 |
| WO | WO 2004 031631 | 4/2004 |

OTHER PUBLICATIONS

International Search Report for PCT/FR04/50605.

* cited by examiner

*Primary Examiner*—John Rivell
*Assistant Examiner*—Craig M. Schneider
(74) *Attorney, Agent, or Firm*—Christopher J. Cronin

(57) ABSTRACT

An apparatus and a method for fluid distribution and control. A valve body defines at least two pairs of chambers which are each connectable to an external fluid circuit. A mobile structure, which moves according to a controlling unit, forms an internal penetrating passage. An internal bearing surface, which is located at the first end of the internal passage, is capable of cooperating in a sliding manner with a stationary piston head. The internal bearing surface may move beyond either side of the piston head. When the mobile structure is in an extreme position, an end chamber of the valve body is in fluid communication with the internal passage. When coupled with a PSA adsorber system, the system is capable of supplying oxygen enriched air to an occupant of an aircraft.

7 Claims, 1 Drawing Sheet

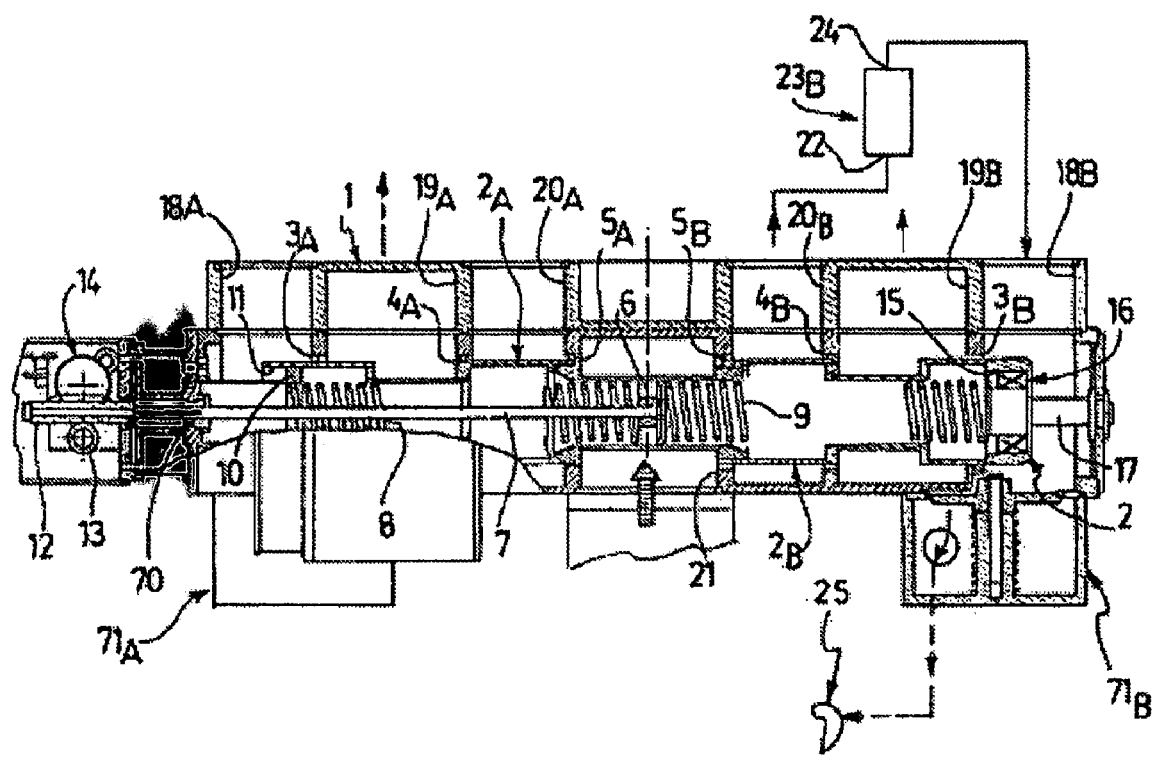
FIGURE

FLUID DISTRIBUTION AND CONTROL VALVE AND USE THEREOF TO SUPPLY ENRICHED AIR TO THE OCCUPANTS OF AN AIRCRAFT

Fluid distribution and control valve and use thereof to supply enriched air to the occupants of an aircraft This application claims the benefit of priority under 35 U.S.C. § 119(a) and (b) to French Application No. 04-50605, filed Mar. 26, 2004, the entire contents of which are incorporated herein by reference.

BACKGROUND

The present invention relates to fluid distribution and control valves, of the type comprising a valve body defining at least two pairs of chambers each connectable to an external fluid circuit, and a mobile structure moveable by control means for selectively establishing a fluid communication between at least two of the chambers, particularly for an onboard system for supplying oxygen-enriched breathing gas to at least one occupant of an aircraft.

A valve of this type is described in Patent WO-A-2004/031631 in the name of the Applicant.

It is an object of the present invention to propose an improved fluid distribution and control valve, with enhanced safety and low construction and use costs.

SUMMARY

For this purpose, according to one aspect of the invention, the mobile structure forms an internal penetrating passage defining, at one end, an internal bearing surface of reduced extension cooperating slidingly with a stationary piston head and moveable beyond, on either side of, said piston head in extreme positions of the piston structure, to make the internal passage communicate with an end chamber of the valve body, typically to connect the end chambers with one another.

According to other features of the invention, the valve structure, advantageously with linear movement, comprises two hollow portions loaded one with respect to the other by elastic means, the control means comprising a rod extending into one of said hollow portions and terminating in a head inserted between the ends opposite the two hollow portions, on which the elastic means are advantageously supported;

the valve comprises two pairs of three chambers each disposed on either side, advantageously symmetrically, of a median chamber;

each group of three chambers is connectable to an adsorber for separating components of air, the median chamber of the valve being connectable to a source of pressurized air.

BRIEF DESCRIPTION OF THE DRAWING

For a further understanding of the nature and objects for the present invention, reference should be made to the following detailed description, taken in conjunction with the accompanying drawing, in which like elements are given the same or analogous reference numbers and wherein:

The FIGURE illustrates a cross sectional schematic view of one embodiment, according to the current invention, of a distribution and control valve.

The present invention further relates to the use of such a valve for supplying oxygen-enriched air to at least one occupant of an aircraft.

It can be understood that the invention proposes a distribution and control valve useable in particular with a PSA type oxygen concentrator with two adsorbers and, if possible, with a single motor, to perform the distribution and elution functions. Furthermore, the arrangement according to the invention, as required, performs a function of automatic closure of the inlet gas, the return springs loading the hollow portions of the mobile structure exerting their effort in case of accidental interruption of the electric power supply to the distributor and automatically returning the mobile structure to the central shutoff position, thereby procuring enhanced safety in use.

DESCRIPTION OF PREFERRED EMBODIMENTS

In the embodiment shown in the FIGURE, a valve according to the invention comprises a valve body 1, typically of a generally cylindrical configuration, in which a plurality of chambers are arranged separated from one another by parallel transverse partitions provided with penetrating orifices aligned with the axis of the valve body and selectively closable or not by a valve slide structure generally designated by the numeral 2.

More specifically, as shown in the FIGURE, the slide structure 2 comprises two tubular hollow portions arranged end to end 2A, 2B, each hollow portion externally defining two bearing surfaces of widened diameter cooperating in a sealed manner with the orifices of partitions 3A, 4A, 5A, 3B, 4B, 5B, respectively. The slide structure 2A, 2B can be actuated by a piston head 6, typically of tubular shape with a central perforated partition, mounted at the end of a piston rod 7 extending coaxially into the hollow portion 2A and imprisoned between the ends opposite the two hollow portions 2A, 2B. The latter are each loaded symmetrically by a spring 8, 9 bearing on an end ring such as 10 itself bearing against an internal radial stop like the spring clip 11. The end of the rod 7 opposite the piston head 6, projecting in a sealed manner via a seal 70 beyond the valve body 1, comprises a helical gear 12 cooperating with a toothed wheel 13 actuated by an electric stepper servomotor 14 associated at least with one detector for detecting the position of the toothed wheel 13 and/or of the rod 7.

According to one aspect of the invention, one of the hollow portions, in this case the portion 2B in FIG. 1, comprises at its free end an internal cylindrical bearing surface 15 of short axial extension cooperating slidingly and in a sealed manner with a stationary head 16 mounted at the end of a rod 17 integral with the end wall closing the valve body 1 and extending axially into the hollow portion 2B.

The head 16 is located in an end chamber 18B formed in the body 1 and separated by the bearing surface 3B from an intermediate chamber 19B, itself separated, by the bearing surface 4B, from a central chamber 20B.

The free end of the hollow portion 2A extends symmetrically into an end chamber 18A adjacent to an intermediate chamber 19A, itself adjacent to a central chamber 20A. The central chambers 20A, 20B are separated, by bearing surfaces 5A, 5B respectively, from a median chamber 21 in which the piston head 6 is located. The end chamber 18A communicates with the interior of the hollow portion 2A.

It may be understood that, with the arrangement described above, a selective movement of the mobile structure 2, under the action of the servomotor 14, makes it possible not only to establish, advantageously progressively, passages between the chambers of each group 18-19-20 and/or the median chamber 21, but also, when the internal bearing surface 15 extends beyond the head 16 to the left or to the right, to establish a communication between the end chambers 18A, 18B via the internal passage defined by the hollow mobile slide structure 2.

Furthermore, in case of accidental or deliberate deactivation of the motor 14, the slide structure 2 automatically returns under the effect of the opposing springs 8 and 9 to the "all closed" centered configuration shown in the FIGURE.

In the application, according to a particular aspect of the invention, to the distribution of fluid streams from a PSA oxygen concentrator with two adsorbers operating alternately, of which just one (23B) is shown in the FIGURE, the median chamber 21 is connected to a source supplying it with pressurized air (motor or independent compressor), as shown by the grey arrow, and the adjacent chamber 20B is connected to the air inlet 22 of an adsorber 23B, typically containing at least one particulate material for separating a component from air, advantageously a zeolite X, of which the oxygen production outlet 24 is connected to the end chamber 18B, itself connected, as shown by the dotted arrow, via a check valve housing 71B, to a feed line of at least one passenger or crew-member oxygen mask such as 25. The intermediate chamber 19B (like the symmetrical chamber 19A) is connected in the regeneration phase to a line (not shown) for discharging the nitrogen-enriched gas mixture to the atmosphere.

Thus, with the head projection system 16 described above, the arrangement according to the invention makes it possible, with a single motor 14, to add to the normal enriched oxygen production phase, with supply to the mask 25, a final production phase in an adsorber with simultaneous elution of the other adsorber with a portion of the production gas transiting through the slide structure 2 and arriving back at the axially opposite end (production) chamber so as to reach the outlet of the adsorber in the regeneration phase and to elute this adsorber before it returns to the production phase.

Although the invention has been described in relation to one particular embodiment, it is not limited thereto, but is susceptible to modifications and variants that will appear to a person skilled in the art in connection with the claims below.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. An apparatus which may be used as a fluid distribution and control valve, said apparatus comprising:
   a) a valve body, wherein:
      1) said valve body comprises at least two pairs of chambers; and
      2) each said pair is substantially connectable to an external fluid circuit;
   b) a mobile structure, wherein said mobile structure is moveable by a control means for selectively establishing fluid communication between said chambers, said mobile structure comprising;
      1) a first portion of said mobile structure;
      2) a second portion of said mobile structure; and
      3) an elastic means for loading said first and said second portions with respect to each other;
   c) an internal penetrating passage formed by said mobile structure;
   d) an internal bearing surface located at a first end of said internal passage;
   e) a stationary piston head, wherein:
      1) said internal bearing surface cooperates in a sliding manner with said piston head; and
      2) said internal bearing surface is capable of moving beyond either side of said piston head; and
   f) an end chamber of said valve body, wherein said internal passage is in fluid communication with said end chamber when said mobile structure is in an extreme position, wherein said control means comprises:
      1) a rod extending into said first portion;
      2) a head connected to the end of said rod, wherein said head is substantially located between said first and said second portions.

2. The apparatus of claim 1, wherein said mobile structure is moveable in a substantially linear direction.

3. The apparatus of claim 1, wherein:
   a) said pairs of chambers comprise two pairs of three chambers; and
   b) each said pair of three chambers is located on either side of a median chamber.

4. The apparatus of claim 3, wherein:
   a) each said pair of three chambers is connectable to an adsorber for separating the components of air; and
   b) said median chamber is connectable to a source of pressurized air.

5. The apparatus of claim 4, wherein each said pair of three chambers comprises an end chamber connected to the production outlet of said associated adsorber.

6. The apparatus of claim 4, wherein said mobile structure is moveable in a substantially linear direction.

7. A method which may be used for supplying oxygen enriched air in an aircraft, said method comprising sending oxygen-enriched air through a fluid distribution and control valve to at least one occupant of an aircraft, wherein said fluid distribution and control valve comprises:
   a) a valve body, wherein:
      1) said valve body comprises at least two pairs of chambers; and
      2) each said pair is substantially connectable to an external fluid circuit;
   b) a mobile structure, wherein said mobile structure is moveable by a control means for selectively establishing fluid communication between said chambers, said mobile structure comprising;
      1) a first portion of said mobile structure;
      2) a second portion of said mobile structure; and
      3) an elastic means for loading said first and said second portions with respect to each other;
   c) an internal penetrating passage formed by said mobile structure;
   d) an internal bearing surface located at a first end of said internal passage;
   e) a stationary piston head, wherein:
      1) said internal bearing surface cooperates in a sliding manner with said piston head; and
      2) said internal bearing surface is capable of moving beyond either side of said piston head; and
   f) an end chamber of said valve body, wherein said internal passage is in fluid communication with said end chamber when said mobile structure is in an extreme position, wherein said control means comprises:
      1) a rod extending into said first portion;
      2) a head connected to the end of said rod, wherein said head is substantially located between said first and said second portions.

* * * * *